US011975538B2

(12) United States Patent
Matsuo

(10) Patent No.: US 11,975,538 B2
(45) Date of Patent: May 7, 2024

(54) LIQUID EJECTING APPARATUS AND METHOD OF CONTROLLING LIQUID EJECTING APPARATUS

(71) Applicant: Seiko Epson Corporation, Tokyo (JP)

(72) Inventor: Kenichiro Matsuo, Matsumoto (JP)

(73) Assignee: SEIKO EPSON CORPORATION (JP)

(*) Notice: Subject to any disclaimer, the term of this patent is extended or adjusted under 35 U.S.C. 154(b) by 227 days.

(21) Appl. No.: 17/700,675

(22) Filed: Mar. 22, 2022

(65) Prior Publication Data

US 2022/0305778 A1 Sep. 29, 2022

(30) Foreign Application Priority Data

Mar. 23, 2021 (JP) ................................. 2021-048259

(51) Int. Cl.
*B41J 2/045* (2006.01)
*B41J 2/21* (2006.01)

(52) U.S. Cl.
CPC ....... *B41J 2/04581* (2013.01); *B41J 2/04588* (2013.01); *B41J 2/04596* (2013.01); *B41J 2/2103* (2013.01)

(58) Field of Classification Search
CPC ................ B41J 2/04581; B41J 2/04588; B41J 2/04596; B41J 2/2103; B41J 2/04551; B41J 2002/1657; B41J 2/165; B41J 2/16517
See application file for complete search history.

(56) References Cited

U.S. PATENT DOCUMENTS

| | | | |
|---|---|---|---|
| 2005/0219280 A1 | 10/2005 | Hiwada et al. |
| 2011/0285773 A1 | 11/2011 | Shinkawa |
| 2012/0194585 A1 | 8/2012 | Fukuda |

(Continued)

FOREIGN PATENT DOCUMENTS

| | | |
|---|---|---|
| JP | 2002-001951 A | 1/2002 |
| JP | 2005-289013 A | 10/2005 |
| JP | 2012-096423 A | 5/2012 |

(Continued)

OTHER PUBLICATIONS

Matsushita, Junichiro; Driving Method of Liquid Discharge Device and Liquid Discharge Device, Feb. 18, 2021, Japan, All Pages (Year: 2021).*

*Primary Examiner* — Justin Seo
*Assistant Examiner* — Tracey M Mcmillion
(74) *Attorney, Agent, or Firm* — Harness, Dickey & Pierce, P.L.C.

(57) ABSTRACT

A liquid ejecting apparatus includes a plurality of ejecting unit groups each including nozzles configured to eject liquid. The ejecting unit group configured to eject a liquid to be used in the printing is referred to as a to-be-used ejecting unit group. The ejecting unit group configured to eject a liquid not to be used in the printing is referred to as the non-use ejecting unit group. In a print mode with a non-use nozzle group in which any of the plurality of kinds of liquids is not used, the driving elements of the to-be-used ejecting unit group is supplied with the in-printing micro-vibration pulse in a period without ejection of the ink, and the driving elements of the non-use ejecting unit group is not supplied with the micro-vibration pulse even in the period without ejection of the ink.

12 Claims, 5 Drawing Sheets

(56) References Cited

U.S. PATENT DOCUMENTS

2012/0274689 A1* 11/2012 Zhang .................. B41J 2/14274
347/10

FOREIGN PATENT DOCUMENTS

| | | | |
|---|---|---|---|
| JP | 2012-158000 | A | 8/2012 |
| JP | 2014-004750 | A | 1/2014 |
| JP | 2014-177127 | A | 9/2014 |
| JP | 2015-112828 | A | 6/2015 |
| JP | 2015-143030 | A | 8/2015 |

* cited by examiner

LIQUID EJECTING APPARATUS AND METHOD OF CONTROLLING LIQUID EJECTING APPARATUS

The present application is based on, and claims priority from JP Application Serial Number 2021-048259, filed Mar. 23, 2021, the disclosure of which is hereby incorporated by reference herein in its entirety.

BACKGROUND

1. Technical Field

The present disclosure relates to a liquid ejecting apparatus and a method of controlling a liquid ejecting apparatus.

2. Related Art

JP-A-2002-1951 discloses an ink jet printer, which is an example of a liquid ejecting apparatus including a plurality of nozzles, the liquid ejecting apparatus performing printing on a medium by ejecting from the nozzles an ink which is an example of a liquid contained in a pressure chamber that communicates with corresponding one of the nozzles. Such an ink jet printer has a problem of increased viscosity of an ink attributable to evaporation of moisture from a nozzle opening, for example. JP-A-2002-1951 discloses a configuration that enables reduction in increased viscosity of an ink in the vicinity of a nozzle by performing micro-vibration, the micro-vibration causing the ink to be vibrated in the vicinity of a nozzle opening to such an extent that the ink is not ejected from the nozzle. In addition, to perform multicolored printing, the printer includes, as an example of a nozzle group, a plurality of nozzles configured to eject a black ink and a plurality of nozzles configured to eject a color ink that is different in color from the black ink.

In the liquid ejecting apparatus described in JP-A-2002-1951, however, also when color printing is performed without causing a nozzle group configured to eject a black ink to eject an ink, micro-vibration is performed on a black ink ejecting unit group including a plurality of nozzles that constitutes the nozzle group configured to eject a black ink. In this case, there is a possibility that any ink with increased viscosity in the vicinity of a nozzle may diffuse to side of a pressure chamber, by the black ink ejecting unit group, which is a non-use ejecting unit group not used in printing, performing micro-vibration.

SUMMARY

A liquid ejecting apparatus includes: a plurality of ejecting units each including a nozzle configured to eject a liquid, a pressure chamber that communicates with the nozzle, and a driving element that causes a pressure fluctuation in the liquid in the pressure chamber by being supplied with a driving pulse; a driver circuit configured to supply the driving element of corresponding one of the ejecting units with a driving pulse including an ejection pulse for causing the liquid to be ejected from the nozzle and a micro-vibration pulse for causing a gas-liquid interface in the nozzle to be vibrated when the liquid is not ejected from the nozzle; and a controller. The controller controls, based on a print job for executing a print operation to perform printing on a medium, the driver circuit, thereby executing the print operation by causing the liquid to be ejected from the nozzle, the plurality of ejecting units form a plurality of ejecting unit groups each including a plurality of nozzles constituting a nozzle group configured to eject any of a plurality of kinds of liquids, and in a case in which one of the ejecting unit groups configured to eject a liquid to be used in printing on the medium is referred to as a to-be-used ejecting unit group and one of the ejecting unit groups configured to eject a liquid not to be used in the printing is referred to as the non-use ejecting unit group, when printing is in a print mode without a non-use nozzle group in which the plurality of kinds of liquids are used, the controller controls the driver circuit such that, in a print operation to perform the printing in the print mode without a non-use nozzle group, the driver circuit supplies driving elements of the to-be-used ejecting unit group with the ejection pulse in a period with ejection of the liquid and with the micro-vibration pulse in a period without ejection of the liquid, and when printing is in a print mode with a non-use nozzle group in which any of the plurality of kinds of liquids is not used, the controller controls the driver circuit such that, in a print operation to perform the printing in the print mode with a non-use nozzle group, the driver circuit supplies the driving elements of the to-be-used ejecting unit group with the ejection pulse in a period with ejection of the liquid and with the micro-vibration pulse in a period without ejection of the liquid and does not supply driving elements of the non-use ejecting unit group with the micro-vibration pulse even in the period without ejection of the liquid.

A method of controlling a liquid ejecting apparatus includes a plurality of ejecting units each including a nozzle configured to eject a liquid, a pressure chamber that communicates with the nozzle, and a driving element that causes a pressure fluctuation in the liquid in the pressure chamber by being supplied with a driving pulse, the plurality of ejecting units forming a plurality of ejecting unit groups each including a plurality of nozzles constituting a nozzle group configured to eject any of a plurality of kinds of liquids, the liquid ejecting apparatus being configured to execute a print operation to perform printing on a medium by supplying the driving element with a driving pulse including an ejection pulse for causing the liquid to be ejected from the nozzle and a micro-vibration pulse for causing a gas-liquid interface in the nozzle to be vibrated when the liquid is not ejected from the nozzle. The method includes: in a case in which one of the ejecting unit groups configured to eject a liquid to be used in printing on the medium is referred to as a to-be-used ejecting unit group and one of the ejecting unit groups configured to eject a liquid not to be used in the printing is referred to as the non-use ejecting unit group, when printing is in a print mode without a non-use nozzle group in which the plurality of kinds of liquids are used, in a print operation to perform the printing in the print mode without a non-use nozzle group, supplying driving elements of the to-be-used ejecting unit group with the ejection pulse in a period with ejection of the liquid and with the micro-vibration pulse in a period without ejection of the liquid; when printing is in a print mode with a non-use nozzle group in which any of the plurality of kinds of liquids is not used, in a print operation to perform the printing in the print mode with a non-use nozzle group, supplying the driving elements of the to-be-used ejecting unit group with the ejection pulse in a period with ejection of the liquid and with the micro-vibration pulse in a period without ejection of the liquid and not supplying driving elements of the non-use ejecting unit group with the micro-vibration pulse even in the period without ejection of the liquid.

DESCRIPTION OF EXEMPLARY EMBODIMENTS

Figure 1:
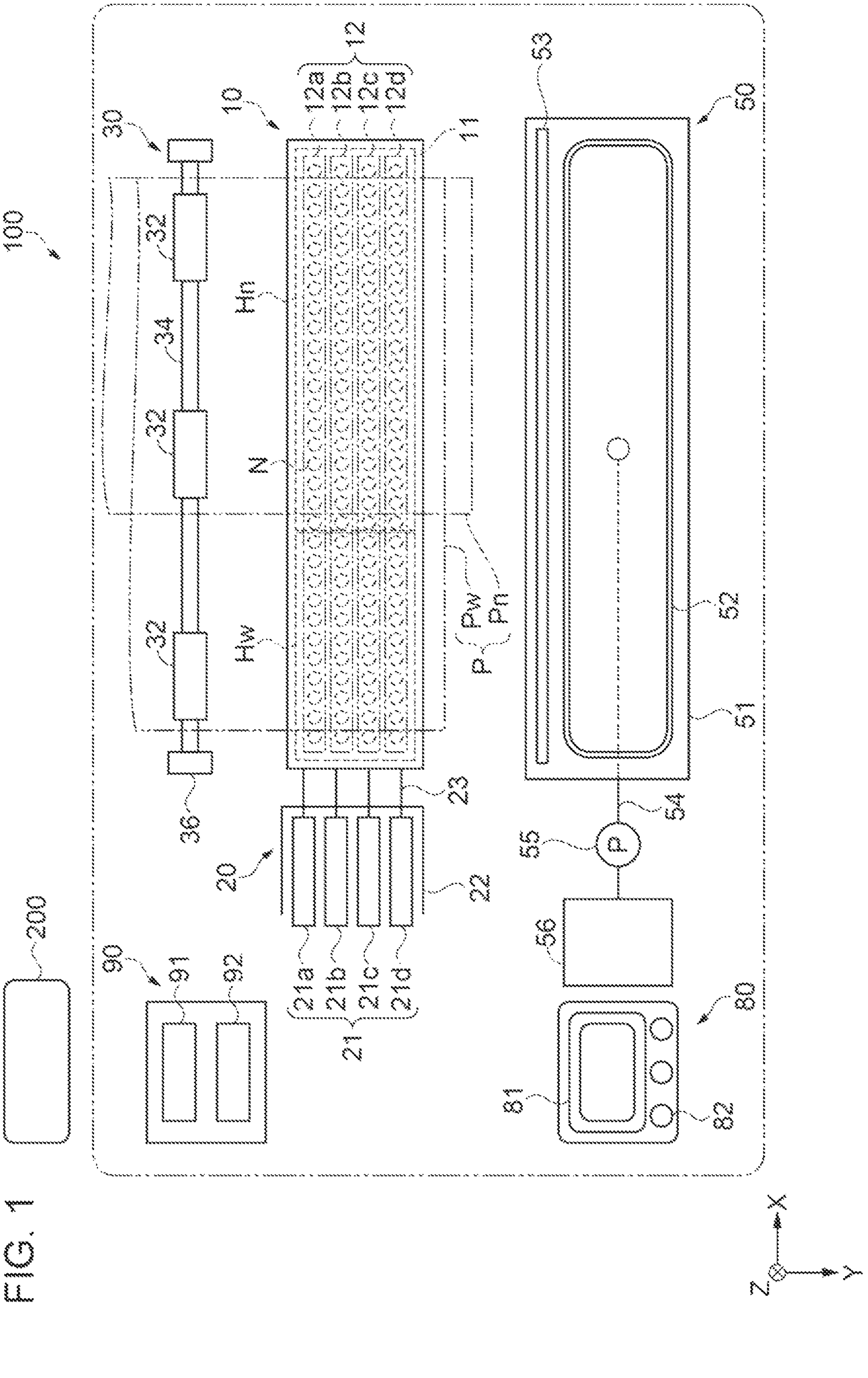
FIG. 1 is a block diagram illustrating a schematic configuration of a liquid ejecting apparatus as an embodiment of the present disclosure.

In the following, a description is given of the present disclosure. In each of the figures, same reference numerals are assigned to same members, and an overlapping description thereof is omitted.

In addition, in each of the figures, X, Y, and Z represent three spatial axes that are orthogonal to each other. Directions along these axes are herein referred to as an X axis direction, a Y axis direction, and a Z axis direction, respectively. When a direction is identified, a description is given by using a plus sign and a minus sign to represent a direction with a positive direction as "+" and a negative direction as "−" and referring to a direction pointed by an arrow in each figure as a + direction and a direction opposite to the arrow as a − direction. In addition, a Z direction represents a vertical direction, a +Z direction represents a downward vertical direction, and a −Z direction represents an upward vertical direction. Furthermore, the three X, Y, and Z spatial axes that limit neither positive nor negative direction are described as an X axis, a Y axis, and a Z axis, respectively.

In the present embodiment, a liquid ejecting apparatus 100 is configured as an ink jet printer and ejects an ink on paper P to print an image or a character. The paper P is an example of a medium, and the ink is an example of a liquid. Note that in place of the paper P, any kind of medium such as a resin film, a cloth, or the like, may be an ejection target of an ink.

As illustrated in FIG. 1, the liquid ejecting apparatus 100 includes a liquid ejecting head 10, a liquid supply unit 20, a transport unit 30, a maintenance unit 50, an input and output unit 80, and a controller 90. To the liquid ejecting apparatus 100 is coupled to an external apparatus 200 by wire or wirelessly. The external apparatus 200 is, for example, an electronic device such as a computer, a digital camera, or a mobile phone that handles an image. The external apparatus 200 sequentially supplies the liquid ejecting apparatus 100 with a print job J. The print job J is an instruction for a series of operations to print an image or a character on the paper P. For example, in the print job J, an instruction on various kinds of conditions is given, such as a number of papers to be printed, a duty, a print mode (color/monochrome), a size of paper P (Pw/Pn), a kind of paper P (photo paper/plain paper), picture quality mode (high picture quality/normal/low picture quality), a direction in which the paper P is transported by the transport unit 30, or the like.

The liquid supply unit 20 supplies the liquid ejecting head 10 with an ink. The liquid supply unit 20 includes a liquid container holding unit 22 and a coupling flow channel 23. The liquid container holding unit 22 holds a liquid container 21. The liquid container holding unit 22 of the present embodiment removably holds a plurality of liquid containers 21*a*, 21*b*, 21*c*, and 21*d*. Each of the liquid containers 21*a*, 21*b*, 21*c*, and 21*d* contains a black ink, a yellow ink, a magenta ink, and a cyan ink, respectively. The black ink, the yellow ink, the magenta ink, and the cyan ink are examples of a plurality of kinds of liquids. The coupling flow channel 23 couples the liquid container holding unit 22 with the liquid ejecting head 10, so that any ink in the liquid container 21 held by the liquid container holding unit 22 may be supplied to the liquid ejecting head 10.

The transport unit 30 transports the paper P to a transport direction. As illustrated in FIG. 1, transport directions in the present embodiment are a +Y direction or a −Y direction. The transport unit 30 includes a transport rod 34 on which three transport rollers 32 are placed, and a transport motor 36 that rotates and drives the transport rod 34. By the transport motor 36 rotating and driving the transport rod 34, the plurality of transport rollers 32 rotates to transport the paper P to the +Y direction in the transport direction. Note that the number of the transport rollers 32 is not limited to three and may be any number. In addition, the liquid ejecting apparatus 100 may be configured to include a plurality of transport units 30.

The maintenance unit 50 performs maintenance of the liquid ejecting head 10. The maintenance unit 50 includes a maintenance unit holder 51, a cap 52, a wiper 53, a waste liquid tube 54, a suction pump 55, and a waste liquid collection unit 56. The maintenance unit holder 51 holds the cap 52 and the wiper 53. The maintenance unit holder 51 is movable in the Y axis direction.

By coming into contact with a nozzle surface 11 of the liquid ejecting head 10, to be described below, the cap 52 performs capping that forms a capping space where the plurality of nozzles N open. The maintenance unit 50 suppresses evaporation of moisture from an ink via an opening of each of the nozzles N of the liquid ejecting head 10, by performing the capping when no print operation is executed and the liquid ejecting head 10 is in a standby state. The maintenance unit 50 performs the maintenance of the liquid ejecting head 10 by performing the capping.

The cap 52 is movable to an isolated position that does not face the nozzle surface 11 of the liquid ejecting head 10, a capping position that is in contact with the nozzle surface 11 and caps the nozzle surface 11, and an opposite position that faces the nozzle surface 11 and is not in contact therewith. The cap 52 at the isolated position is located on side of the +Y direction with respect to a print position where the liquid ejecting head 10 as illustrated in FIG. 1 performs printing on the paper P. The cap 52 at the capping position and the opposite position is located at a position that faces the nozzle surface 11 of the liquid ejecting head 10 which is at the print position, and is located on side of the −Y direction with respect to the isolated position. In addition, the cap 52 at the capping position and the opposite position is located between the liquid ejecting head 10 and the paper P in the Z axis direction, when the paper P is in a printable area on side of the +Z direction of the liquid ejecting head 10.

The cap 52 is in communication with the waste liquid collection unit 56 that collects a waste liquid, through the waste liquid tube 54. In the waste liquid tube 54 is provided the suction pump 55 for suctioning the capping space formed by the cap 52. The maintenance unit 50 maintains an ink in the liquid ejecting head 10 in a good condition, by driving the suction pump 55 with the cap 52 at the capping position, thereby discharging the ink to the capping space from each of the plurality of nozzles N. The maintenance unit 50 performs the maintenance of the liquid ejecting head 10 by suctioning the ink in the liquid ejecting head 10 via the nozzles N. The ink discharged into the capping space is collected by the waste liquid collecting unit 56 via the waste liquid tube 54.

In addition, in the opposite position, the cap 52 receives the ink ejected from each of the nozzles N by a flushing operation to be described below. More specifically, the cap 52 of the present embodiment also functions as a flushing receiver FLR. A flushing operation is a maintenance operation to eject the ink from each of the nozzles N of the liquid ejecting head 10 with the aim of maintaining the ink in the liquid ejecting head 10 in a good condition. Note that in addition to the cap 52, the maintenance unit 50 may have a flushing receiver FLR that receives the ink ejected from each of the nozzles N by the flushing operation.

The maintenance unit 50 performs the maintenance of the liquid ejecting head 10 by the wiper 53 wiping the nozzle surface 11 of the liquid ejecting head 10. The wiper 53 moves in the Z axis direction between the non-contact position that does not contact the nozzle surface 11 and a wiping position that is able to contact the nozzle surface 11. In the present embodiment, with the wiper 53 in the wiping position, the maintenance unit holder 51 holding the wiper 53 is moved in the Y axis direction, thus performing wiping of the nozzle surface 11.

The input and output unit 80 includes a display unit 81 and an operation unit 82. The operation unit 82 is an example of the input unit. The display unit 81 is an example of an announcing unit that displays a guidance on operations of the liquid ejecting apparatus 100 and announces information regarding the liquid ejecting apparatus 100. A user is able to carry out various kinds of operations in the liquid ejecting apparatus 100 by operating the operation unit 82 while referring to contents displayed on the display unit 81. Note that when the display unit 81 is configured as a liquid crystal display module including a touch panel function and has a capability as an operation unit that performs various kinds of settings on the liquid ejecting apparatus 100, the operation unit 82 may be omitted.

The user is able to input the various kinds of conditions of the above-described print job J by operating the operation unit 82, for example. Therefore, the print job J is inputted from the external apparatus 200 to the controller 90, and also inputted from the input and output unit 80 to the controller 90, depending on an operation performed by the user. For example, in a copying operation to print on the paper P an image scanned by a scanner (not illustrated) or a print operation to print an image stored in a recording medium such as a memory card or a USB (Universal Serial Bus) memory, or the like, the user may input the print job J by operating the input and output unit 80.

The controller 90 controls the entire liquid ejecting apparatus 100. For example, the controller 90 controls a transport operation of the paper P along the transport direction by the transport unit 30, an ejection operation of an ink from the nozzle N of the liquid ejecting head 10, the maintenance operation of the liquid ejecting head 10 by the maintenance unit 50, control of the liquid ejecting apparatus 100 based on a user instruction by the input and output unit 80, and announcement to the user, or the like.

The controller 90 includes a control apparatus 91 and a storage apparatus 92. The control apparatus 91 is a single processor or a plurality of processors that performs or perform various kinds of arithmetic operations and control. Specifically, one or more kinds of processors such as a central processing unit (CPU), a graphic processing unit (GPU), a digital signal processor (DSP), or a field programmable gate array (FPGA) or the like, for example, constitute the control apparatus 91. The storage apparatus 92 is a single memory or a plurality of memories that stores or store a program executed by the control apparatus 91 and various kinds of data used by the control apparatus 91. For example, a recording medium such as a semiconductor recording medium or a magnetic recording medium is used as the storage apparatus 92. A combination of more than one kind of recording media may be used as the storage apparatus 92.

The liquid ejecting head 10 has the plurality of nozzles N that ejects an ink. The plurality of nozzles N opens to the nozzle surface 11 which is a surface on side of the +Z direction of the liquid ejecting head 10. By being arranged at equal intervals in one direction, the plurality of nozzles N forms a nozzle array 12. The liquid ejecting head 10 of the present embodiment is a so-called line head. Thus, the nozzle array 12 lies along the X axis direction, and of the plurality of nozzles N that forms the nozzle array 12, a dimension between the nozzles N at both ends in the X axis direction is longer than a width dimension of the paper P. The nozzle array 12 is an example of a nozzle group. In the present embodiment, the nozzle array 12 includes a plurality of nozzle arrays 12*a*, 12*b*, 12*c*, and 12*d*. The plurality of nozzle arrays 12*a*, 12*b*, 12*c*, and 12*d* is provided so that they are spaced apart in the Y axis direction and arranged from side of the −Y direction to side of the +Y direction in order of the nozzle arrays 12*a*, 12*b*, 12*c*, and 12*d*.

In the present embodiment, the plurality of nozzles N that forms the nozzle array 12*a* ejects a black ink to be supplied from the liquid container 21*a* to the liquid ejecting head 10. In addition, the plurality of nozzles N that forms the nozzle array 12*b* ejects a yellow ink to be supplied from the liquid container 21*b* to the liquid ejecting head 10. In addition, the plurality of nozzles N that forms the nozzle array 12*c* ejects a magenta ink to be supplied from the liquid container 21*c* to the liquid ejecting head 10. In addition, the plurality of nozzles N that forms the nozzle array 12*d* ejects a cyan ink to be supplied from the liquid container 21*d* to the liquid ejecting head 10.

A black ink, a yellow ink, a magenta ink, and a cyan ink are each an example of a plurality of kinds of liquids. In addition, the yellow ink, the magenta ink, and the cyan ink are each an example of a color ink that is different in color from the black ink. In addition, the black ink and the color ink different in color from the black ink are each an example of the plurality of kinds of liquids. The plurality of nozzle arrays 12*a*, 12*b*, 12*c*, and 12*d* are each an example of a nozzle group configured to eject any liquid of the plurality of kinds of liquids. The nozzle array 12*a* is a black ink nozzle group configured to eject the black ink. Each of the nozzle arrays 12*b*, 12*c*, and 12*d* is an example of a color ink nozzle group configured to eject the color ink.

In addition, on the nozzle surface 11, when the paper P is transported in a longitudinal direction as illustrated in FIG. 1, the plurality of nozzles N of the liquid ejecting head 10 of the present embodiment forms nozzle portions Hn and nozzle portions Hw, the nozzle portions Hn being provided in an area corresponding to paper Pn a size of which is smaller than that of paper Pw, and the nozzle portions Hw being provided in an area adjacent to side of the −X direction of the nozzle portions Hn. The plurality of nozzles N that forms the nozzle portions Hn is used when ejecting an ink to the paper Pw and the paper Pn to perform printing. The plurality of nozzles N that forms the nozzle portions Hw is used when ejecting an ink to the paper Pw to perform printing, and is not used when ejecting an ink to the paper Pn to perform printing. Note that a dimension of the paper Pn in the X axis direction when it is transported in a lateral direction is same as a dimension of the paper Pw in the X axis direction when it is transported in the longitudinal direction.

Figure 2:
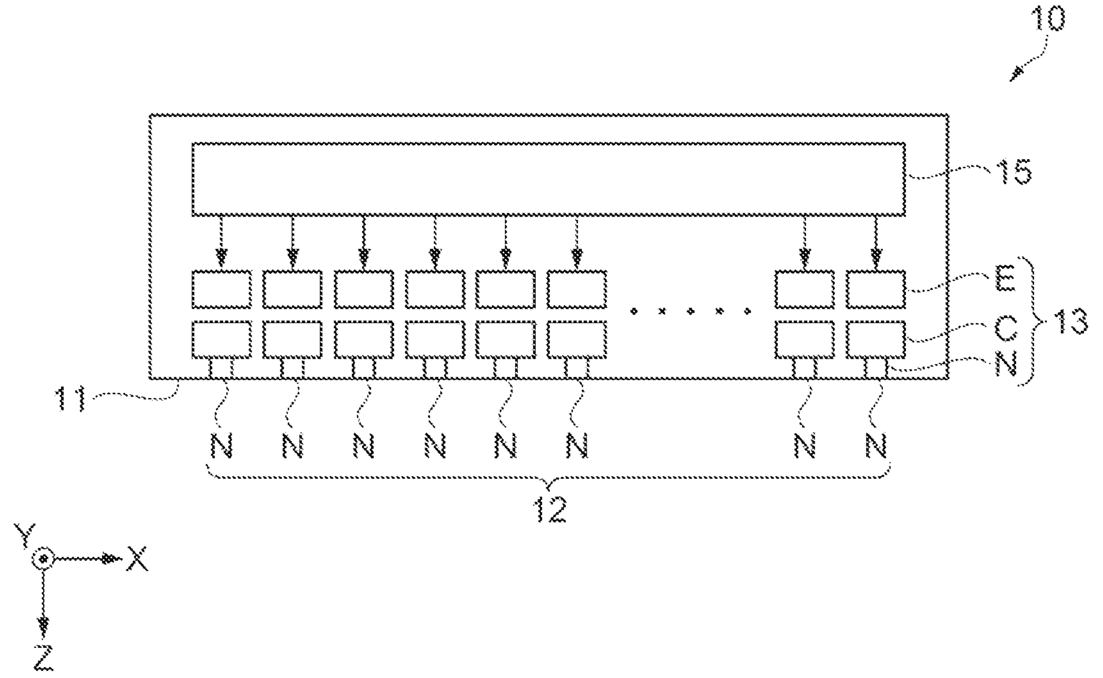
FIG. 2 is a diagram illustrating a configuration of a liquid ejecting head.

As illustrated in FIG. 2, the liquid ejecting head 10 includes a plurality of nozzles N, a plurality of pressure chambers C, a plurality of driving elements E, and a driver circuit 15. The nozzles N, the pressure chambers C, and the driving elements E constitute an ejecting unit 13 configured to eject an ink. Therefore, the liquid ejecting head 10 has a plurality of ejecting units 13. It is possible to state that the plurality of ejecting units 13 forms a black ink ejecting unit group having the plurality of nozzles N that constitutes the nozzle array 12*a*, a yellow ink ejecting unit group having the plurality of nozzles N that constitutes the nozzle array 12*b*, a magenta ink ejecting unit group having the plurality of nozzles N that constitutes the nozzle array 12*c*, and a cyan ink ejecting unit group having the plurality of nozzles N that constitutes the nozzle array 12*d*.

In addition, it is also possible to state that the plurality of ejecting units 13 black ink ejecting unit group having the plurality of nozzles N that constitutes the nozzle array 12*a* and a color ink ejecting unit group having the plurality of nozzles N that constitutes the nozzle arrays 12*b*, 12*c*, and 12*d*. At this time, it is possible to state that the plurality of ejecting units 13 forms a plurality of ejecting unit groups. In addition, in the following description, in some cases, an ejecting unit group having nozzles N configured to eject an ink that is used in printing of an image or a character on the paper P may be referred to as a to-be-used ejecting unit group, and an ejecting unit group having the nozzles N configured to eject an ink that is not used in that printing may be referred to as the non-use ejecting unit group.

The pressure chamber C and the driving element E are formed for each of the nozzles N. The pressure chamber C is a space communicating with the nozzle N. An ink supplied from the liquid container 21 is filled into a plurality of pressure chambers C of the liquid ejecting head 10. The driving element E changes pressure of the ink in the pressure chamber C. For example, a piezoelectric element that changes a volumetric capacity of the pressure chamber C by deforming a wall surface of the pressure chamber C or a heating element that generates air bubbles in the pressure chamber C by heating the ink in the pressure chamber C is used as the driving element E. By the driving element E changing the pressure of the ink in the pressure chamber C, the ink in the pressure chamber C is ejected from the nozzle N. If a state continues in which no ink is ejected from the nozzle N of the liquid ejecting head 10, evaporation of moisture via an opening of the nozzle N causes the ink in the nozzle N to increase viscosity.

By being controlled by the controller 90, the driver circuit 15 drives each of the plurality of driving elements E. The driver circuit 15 of the present embodiment supplies each of the plurality of driving elements E with a drive pulse P of a driving signal D for each unit period U. Note that the driver circuit 15 may be provided outside of the liquid ejecting head 10.

By controlling the driver circuit 15 based on the print job J inputted to print an image or a character on the page P, the controller 90 executes a print operation of causing the nozzle N of the liquid ejecting head 10 to eject an ink to print the image or the character on the paper P. By controlling the driver circuit 15, the controller 90 also executes a micro-vibration operation to vibrate the ink in the nozzle N without causing it to be ejected. In addition, by controlling the driver circuit 15, the controller 90 executes the flushing operation to eject the ink from the nozzle N, with the aim of maintaining the state of the ink in the liquid ejecting head 10. The flushing operation includes a to-be-used-nozzle-group flushing operation that causes the ink to be ejected from the nozzle N of the to-be-used ejecting unit group with the aim of maintaining the state of the ink in the nozzle N of the to-be-used ejecting unit group and in the pressure chamber C, and a non-use-nozzle-group flushing operation that causes the ink to be ejected from the nozzle N of the non-use ejecting unit group with the aim of maintaining the state of the ink in the nozzle N of the non-use ejecting unit group and in the pressure chamber C.

The controller 90 supplies the driver circuit 15 with a plurality of signals including a control signal S and a driving signal D. The control signal S is a signal to instruct on whether or not each of the plurality of nozzles N jets an ink, for a period U of a predetermined length (hereinafter referred to as a "unit period"). The driving signal D is a voltage signal that fluctuates in a cycle of a unit period U. In the present embodiment, the driving signal D includes a driving signal De, a driving signal Dbm, and a driving signal Dfn. The driving signal Dbm includes an out-of-printing micro-vibration pulse Pbm. The driving signal Dfn includes a flushing pulse Pfn.

In a case where a period during which an ink is ejected from any of the nozzles N of the liquid ejecting head 10 to print an image or a character on the paper P is referred to as an in-printing period, a print operation includes an out-of-printing period that is from release of a standby state in which the liquid ejecting head 10 is capped to start of printing, and an out-of-printing period from end of printing till the liquid ejecting head 10 is capped and enters the standby state. The driving signal De is supplied to the liquid ejecting head 10 in the in-printing period, and the driving signal Dbm and the driving signal Dfn are supplied to the driver circuit 15 in the out-of-printing period.

The out-of-printing period from the release of the standby state in which the liquid ejecting head 10 is capping to the start of printing is also referred to as a pre-printing period. A print area of the paper P where an image or a character is printed is located at a printable position on side of the +Z direction of the nozzle surface 11 of the liquid ejecting head 10. Since printing of an image is not possible in a period during which the print area of the paper P is not at the printable position, it is the out-of-printing period. For example, in a print operation to be executed based on a print job J in which a number of papers to be printed is more than one, a period from when a print area of a printed paper P is transported from the printable position to the +Y direction till a print area of paper P to be transported next is transported to the printable position is the out-of-printing period. In addition, even when the print area of the paper P is at the printable position, a period during which the cap 52 is at a capping position where it faces the nozzle surface 11 and at an opposite position is the out-of-printing period.

Figure 3:
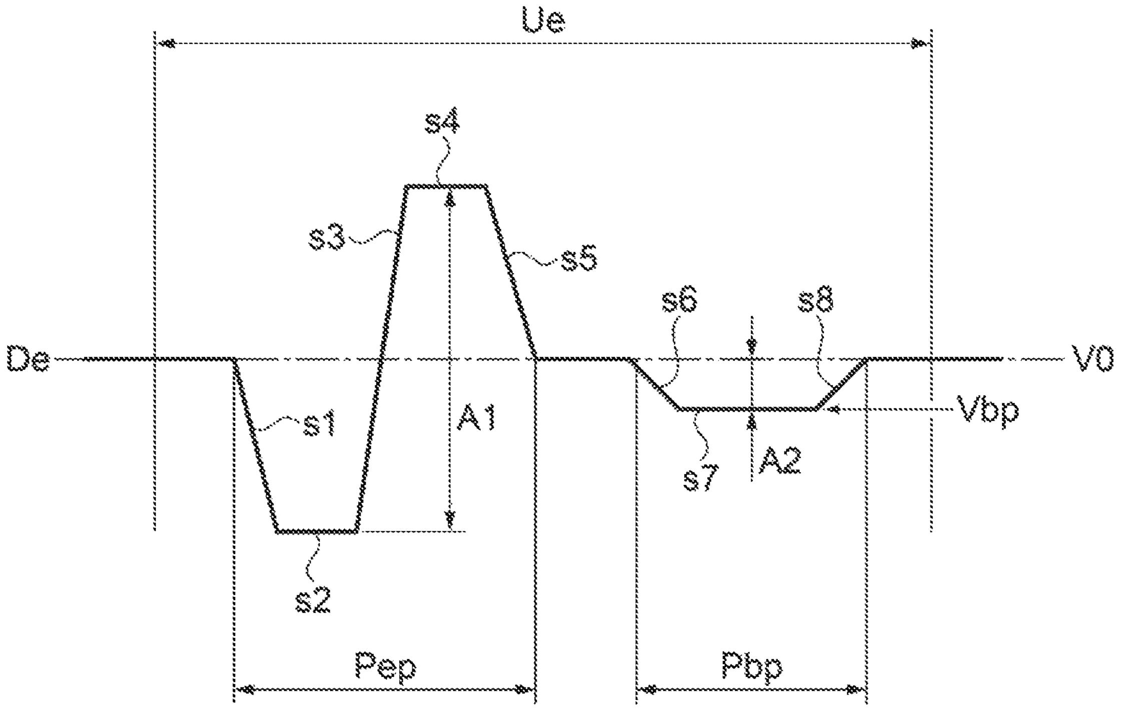
FIG. 3 is a waveform chart of a driving signal.

As illustrated in FIG. 3, in the present embodiment, the driving signal De supplied by the controller 90 to the driver circuit 15 in the in-printing period includes an ejection pulse Pep and an in-printing micro-vibration pulse Pbp for each unit period Ue. The ejection pulse Pep is a driving pulse P supplied by the driver circuit 15 to the driving element E so that an ink is ejected from the nozzle N in the in-printing period. Specifically, the ejection pulse Pep includes a section s1, a section s2, a section s3, a section s4, and a section s5. The section s1 is a section in which a potential drops from a predetermined reference potential V0. The drop of the potential corresponds to a direction in which a volumetric capacity of the pressure chamber C is increased. The section s2 is a section in which the potential at an end of the section s1 is maintained. The section s3 is a section in which the potential rises from the potential in the section s2 to a potential greater than the reference potential V0. The rise of the potential corresponds to a direction in which the volumetric capacity of the pressure chamber C is decreased. The section s4 is a section in which the potential at the end of the section s3 is maintained. The section s5 is a section in which the potential drops from the potential in the section s4 to the reference potential V0.

Supply of the ejection pulse Pep causes the driving element E to work. Thus, a volume of ink drops ejected from the nozzle N depends on a voltage A1 of the ejection pulse Pep. Specifically, the larger an absolute value of the voltage A1 is, the more the volume of the ink drops ejected from the nozzle N increases. Thus, for example, controller 90 may eject ink drops having different volumes from the nozzle N by providing a plurality of driving signals De for which the voltage A1 of the ejection pulse Pep differs and supplying the driver circuit 15 with the plurality of driving signals De.

The in-printing micro-vibration pulse Pbp is a driving pulse P supplied by the driver circuit 15 to the driving element E to generate micro-vibration in the ink in the pressure chamber C without causing the ink to be ejected from the nozzle N in the in-printing period. The in-printing micro-vibration pulse Pbp is an example of the micro-vibration pulse Pb. Specifically, the in-printing micro-vibration pulse Pbp includes a section s6, a section s7, and a section s8. The section s6 is a section in which the potential drops from the reference potential V0 to a potential Vbp. The section s7 is a section in which the potential Vbp at an end of the section s6 is maintained. The section s8 is a section in which the potential rises from the potential Vbp in the section s7 to the reference potential V0.

Note that a waveform of the in-printing micro-vibration pulse Pbp is changed appropriately. The waveform of the in-printing micro-vibration pulse Pbp is not limited to a trapezoid-shaped pulse illustrated in FIG. 3, and, for example, a rectangle-shaped pulse may be adopted as the in-printing micro-vibration pulse Pbp. More specifically, the waveform of the in-printing micro-vibration pulse Pbp in the driving signal De may be arbitrarily changed without being limited to the waveform illustrated in FIG. 3, as far as the waveform of the in-printing micro-vibration pulse Pbp is a waveform that vibrates meniscus formed by the ink in the nozzle N to such an extent that the ink in the pressure chamber C is not ejected from the nozzle N. The meniscus is a gas-liquid interface between the ink in the nozzle N and the atmosphere.

A level of shaking of the meniscus due to in-printing micro-vibration depends on a voltage A2 of the in-printing micro-vibration pulse Pbp. The voltage A2 corresponds to a potential difference between the highest potential and the lowest potential in the in-printing micro-vibration pulse Pbp, more specifically, a potential difference between the potential Vbp in FIG. 3 and the reference potential V0. Specifically, the larger an absolute value of the voltage A2 is, the higher the level of shaking of the meniscus due to the in-printing micro-vibration becomes. The controller 90 is able to control the voltage A2 of the in-printing micro-vibration pulse Pbp.

Figure 4:
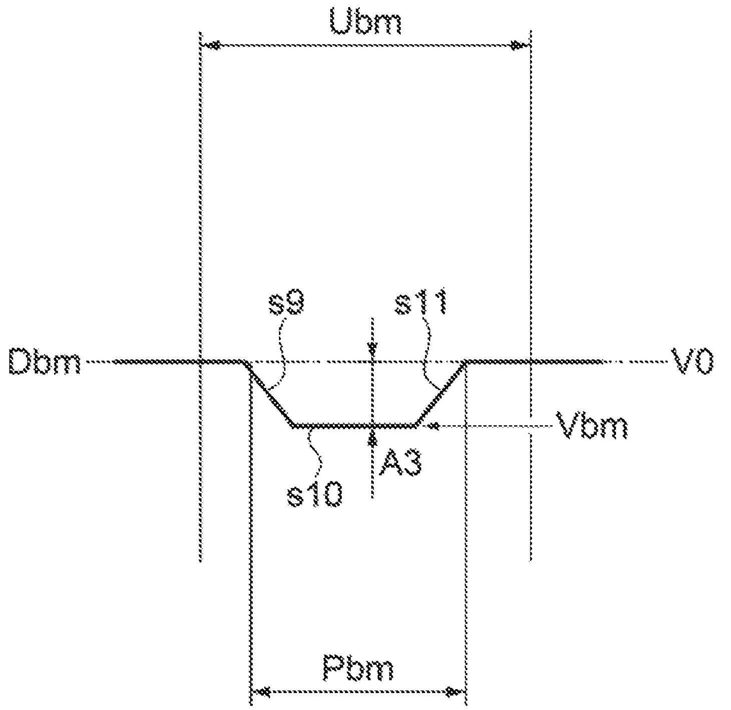
FIG. 4 is a waveform chart of a driving signal for micro-vibration.

As illustrated in FIG. 4, in the present embodiment, the driving signal Dbm supplied by the controller 90 to the driver circuit 15 in the out-of-printing period includes the out-of-printing micro-vibration pulse Pbm for each unit period Ubm. The out-of-printing micro-vibration pulse Pbm is the driving pulse P supplied by the driver circuit 15 to the driving element E in the out-of-printing period to generate micro-vibration in the ink in the pressure chamber C without causing the ink to be ejected from the nozzle N. The out-of-printing micro-vibration pulse Pbm is an example of the micro-vibration pulse Pb. Specifically, the out-of-printing micro-vibration pulse Pbm includes a section s9, a section s10, and a section s11. The section s9 is a section in which the potential drops from the reference voltage V0 to a potential Vbm. The section s10 is a section in which the potential Vbm at an end of the section s9 is maintained. The section s11 is a section in which the potential rises from the potential Vbm in the section s10 to the reference potential V0.

Note that a waveform of the out-of-printing micro-vibration pulse Pbm is changed appropriately. The waveform of the out-of-printing micro-vibration pulse Pbm is not limited to a trapezoid-shaped pulse illustrated in FIG. 4, and, for example, the rectangle-shaped pulse may be used as the out-of-printing micro-vibration pulse Pbm. More specifically, the waveform of the out-of-printing micro-vibration pulse Pbm in the driving signal Dbm may be arbitrarily changed without being limited to the waveform illustrated in FIG. 4, as far as the waveform of the out-of-printing micro-vibration pulse Pbm is a waveform that vibrates the meniscus formed by the ink in the nozzle N to such an extent that the ink in the pressure chamber C is not ejected from the nozzle N.

The level of shaking of the meniscus due to the out-of-printing micro-vibration depends on a voltage A3 of the out-of-printing micro-vibration pulse Pbm. The voltage A3 corresponds to a potential difference between the highest potential and the lowest potential in the out-of-printing micro-vibration pulse Pbm, more specifically, a potential difference between the potential Vbm in FIG. 4 and the reference potential V0. Specifically, the larger an absolute value of the voltage A3 is, the higher the level of shaking of the meniscus due to the in-printing micro-vibration becomes. The controller 90 is able to control the voltage A3 of the in-printing micro-vibration pulse Pbm. The absolute value of the voltage A3 of the out-of-printing micro-vibration pulse Pbm in the present embodiment is set larger than the absolute value of the voltage A2 of the out-of-printing micro-vibration pulse Pbp. Consequently, in the present embodiment, the shaking of the meniscus due to the out-of-printing micro-vibration is higher than the shaking of the meniscus due to the in-printing micro-vibration.

In the out-of-printing period including the above-described pre-printing period, the driver circuit 15 supplies each of the plurality of driving elements E with the out-of-printing micro-vibration pulse Pbm for each unit period Ubm. Supply of the out-of-printing micro-vibration pulse Pbm causes the driving element E to work, which thus generates micro-vibration in the ink in the nozzle N corresponding to the driving element E. The micro-vibration moderately agitates the ink in the nozzle N, which thus reduces local viscosity increase in the vicinity of the nozzle N. Note that although the standby state in which the liquid ejecting head 10 is capped is the out-of-printing period, in a normal case, the controller 90 does not execute the micro-vibration operation.

Figure 5:
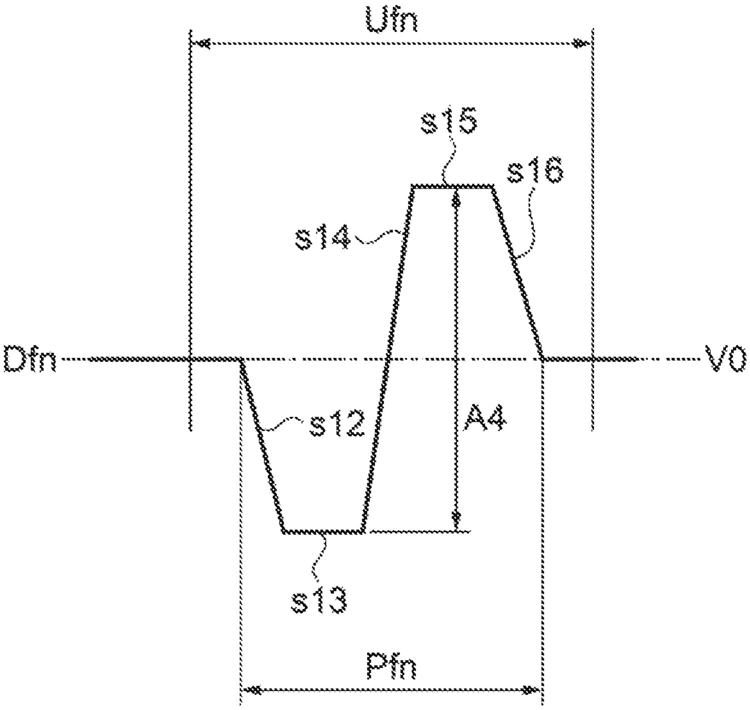
FIG. 5 is a waveform chart of a driving signal for flushing.

As illustrated in FIG. 5, in the present embodiment, the driving signal Dfn supplied by the controller 90 to the driver circuit 15 when the flushing operation is executed includes the flushing pulse Pfn for each unit period Ufn. The flushing pulse Pfn is a driving pulse P supplied by the driver circuit 15 to the driving element E so that the ink is ejected from the nozzle N. The flushing pulse Pfn is an example of a flushing pulse Pf. In addition, the flushing pulse Pfn is included in the ejection pulse.

Specifically, the flushing pulse Pfn includes a section s12, a section s13, a section s14, a section s15, and a section s16. The section s12 is a section in which the potential drops from the predetermined reference potential V0. The drop of the potential corresponds to a direction in which the volumetric capacity of the pressure chamber C is increased. The section s13 is a section in which the potential at an end of the section S12 is maintained. The section s14 is a section in which the potential rises from the potential in the section s13 to a potential greater than the reference potential V0. The rise of the potential corresponds to a direction in which the volumetric capacity of the pressure chamber C is decreased. The section s15 is a section in which the potential at an end of the section s14 is maintained. The section s16 is a section in which the potential in the section s15 drops to the reference potential V0.

Supply of the flushing pulse Pfn causes the driving element E to work. Thus, the volume of the ink drops to be ejected from the nozzle N depends on a voltage A4 of the flushing pulse Pfn. Specifically, the larger an absolute value of the voltage A4 is, the more the volume of the ink drops to be ejected from the nozzle N increases. Thus, a driving signal Dfs including the flushing pulse Pfs with which a voltage is smaller than the voltage A4 is provided, for example. The volume of the ink drops to be ejected from the nozzle N when the driver circuit 15 supplies the flushing pulse Pfs to the driving element E is smaller than the volume of the ink drops to be ejected from the nozzle N when the driver circuit 15 supplies the flushing pulse Pfn to the driving element E. Consequently, by supplying the driving signal Dfs to the driver circuit 15, the controller 90 may execute the flushing operation with a discharge amount of ink from the nozzle N being smaller than that in the case where the driving signal Dfn is supplied to the driver circuit 15.

In a case where in the print operation, the flushing operation has to be executed as a maintenance operation, either immediately after release of capping of the liquid ejecting head 10 before printing starts or immediately before the capping of the liquid ejecting head 10 after the printing ends, the driver circuit 15 supplies each of the plurality of driving elements E with the flushing pulse Pfn for a predetermined number of times. The supply of the flushing pulse Pfn causes the driving elements E to work for the predetermined number of times. As a result, ink drops are ejected from the nozzles N corresponding to the driving elements E for the predetermined number of times. Consequently, the flushing operation is executed as the maintenance operation to be executed either immediately after the release of the capping before the printing starts or immediately before the capping after the printing ends. Note that the flushing operation is executed on the cap 52 placed at the opposite position.

In addition, in the print operation, the driver circuit 15 supplies each of the plurality of driving elements E with the flushing pulse Pfn for the predetermined number of times each time a preset period elapses. The supply of the flushing pulse Pfn causes the driving elements E to work for the predetermined number of times. As a result, the ink drops are ejected from the nozzles N corresponding to the driving elements E for the predetermined number of times. Consequently, in the print operation, the flushing operation is executed at each time interval between executions of preset flushing operations.

In the following description, a flushing operation to be executed in the print operation every time a preset period elapses is referred to as a regular flushing operation when distinguished from the flushing operation to be executed as the maintenance operation immediately after the release of the capping before the printing starts or immediately before the capping after the printing ends. Note that the liquid ejecting head 10 of the present embodiment is located at any one given point in time at a position which is vertically above side of the −Z direction of a transport route through which the paper P is transported. Thus, the regular flushing operation in the present embodiment is executed on the cap 52 placed at the opposite position, with no paper P at a position which is vertically below side of the +Z direction of the nozzle surface 11 of the liquid ejecting head 10 and at the time when a period elapsed since the previously executed flushing operation exceeds the preset period.

For example, when printing of an image or a character on the page P is in a print mode without a non-use nozzle group that uses a black ink, a cyan ink, a magenta ink, and a yellow ink, in the print operation in which printing in the print mode without a non-use nozzle group is performed, by controlling the driver circuit 15, the controller 90 supplies the flushing pulse Pep to the driving elements E of the black ink ejecting unit group, the cyan ink ejecting unit group, the magenta ink ejecting unit group, and the yellow ink ejecting unit group, which are the to-be-used ejecting unit group, for a period with ejection of the ink, and supplies the in-printing micro-vibration pulse Pbp in a period without ejection of the ink.

In the present embodiment, a print mode that the controller 90 determines as a first color print mode from conditions of a print job J corresponds to the print mode without a non-use nozzle group that uses the color ink including the cyan ink, the magenta ink, and the yellow ink, and the black ink. For example, of the conditions of the print job J, when the print mode is color and the picture quality mode is the low quality mode, or when the print mode is color and a kind of paper P is the plain paper, the controller 90 determines that the print mode of the printing to be performed is the first color print mode. At this time, the to-be-used ejecting unit group includes the color ink ejecting unit group including the cyan ink ejecting unit group, the magenta ink ejecting unit group, and the yellow ink ejecting unit group, as well as the black ink ejecting unit group.

The supply of the ejection pulse Pep causes the driving elements E to work. As a result, the ink is ejected from the nozzles N corresponding to the driving elements E. In addition, the supply of the in-printing micro-vibration pulse Pbp causes the driving elements E to work, thus generating the micro-vibration in the ink in the nozzles N corresponding to the driving elements E. In this manner, in the printing on the paper P, the micro-vibration of the ink in the nozzles N of the to-be-used ejecting unit group moderately agitates the ink in the nozzles N, thereby reducing the local viscosity increase in the vicinity of the nozzles N.

On the other hand, in the printing on the paper P, the micro-vibration of the ink in the nozzles N of the non-use ejecting unit group suppresses ejection of the ink in the nozzles N and the pressure chamber C from the nozzles N. This leads to a possibility that the ink with increased viscosity in the vicinity of the nozzles N diffuse in a wider range of the nozzles N and the pressure chamber C than in the case where the ink in the nozzles N of the to-be-used ejecting unit group is subjected to the micro-vibration. In addition, in this case, there is a possibility that a volume of the ink ejected from each of the nozzles N through the non-use-nozzle-group flushing operation intended to maintain the state of the ink in the nozzles N and the pressure chamber C of the non-use ejecting unit groups be larger than a volume of the ink ejected from each of the nozzles N in the to-be-used-nozzle-group flushing operation intended to maintain a state of the ink in the nozzles N and the pressure chamber C of the to-be-used ejecting unit group.

Thus, in printing of an image or a character on the paper P, for example, when the printing is in the print mode with a non-use nozzle group that does not use any of the black ink, the cyan ink, the magenta ink, and the yellow ink, by controlling the driver circuit 15, the controller 90 supplies the driving elements E of the to-be-used ejecting unit group with the ejection pulse Pep in a period with ejection of the ink and supplies the in-printing micro-vibration pulse Pbp in a period without ejection of the ink in-printing period of the print operation to perform the printing in the print mode with a non-use nozzle group, and does not supply the driving elements E of the non-use ejecting unit group with the micro-vibration pulse Pb even in the period without ejection of the ink.

In addition, by controlling the driver circuit 15, the controller 90 supplies the driving elements E of the to-be-used ejecting unit group with the out-of-printing micro-vibration pulse Pbm and does not supply the driving elements E of the non-use ejecting unit group with the micro-vibration pulse Pb, in the out-of-printing period of the print operation to perform the printing in the print mode with a non-use nozzle group.

Consequently, in the printing on the paper P, since the micro-vibration is not performed in the non-use ejecting unit group that is not used, it is possible to suppress diffusion of the ink with increased viscosity in the vicinity of the nozzles N toward the side of the pressure chamber C. In addition, consequently, in the print operation, a degree that the ink with increased viscosity in the vicinity of the nozzles N of the non-use ejecting unit group diffuses into the nozzles N and the pressure chamber C is smaller than a degree that the ink with increased viscosity in the vicinity of the nozzles N of the to-be-used ejecting unit group diffuses into the nozzles N and the pressure chamber C.

Therefore, in the print operation, the controller 90 makes the volume of the ink ejected from each of the nozzles N in the non-use-nozzle-group flushing operation to be executed smaller than the volume of the ink ejected from each of the nozzles N in the to-be-used-nozzle-group flushing operation to be executed. In the printing on the paper P, this makes it possible to reduce a discharge amount of the ink ejected with the aim of maintaining the state of the ink in the non-use ejecting unit group that is not used.

In the print operation, the controller 90 makes the volume of the ink ejected from each of the nozzles N in the non-use-nozzle-group flushing operation to be executed smaller than the volume of the ink ejected from each of the nozzles N in the to-be-used-nozzle-group flushing operation to be executed, by making the volume of the ink ejected from each of the nozzles N in one execution of the non-use-nozzle-group flushing operation smaller than the volume of the ink ejected from each of the nozzles N in one execution of the to-be-used-nozzle-group flushing operation in the print operation. In this case, the controller 90 makes a number of ejections to eject the ink drops from each of the nozzles N in one execution of the non-use-nozzle-group flushing operation smaller than a number of ejections to eject the ink drops from each of the nozzles N in one execution of the to-be-used-nozzle-group flushing operation. Alternatively, the controller 90 may make the volume of the ink drops to be ejected from each of the nozzles N in one execution of the non-use-nozzle-group flushing operation smaller than the volume of the ink drops to be ejected from each of the nozzles N in one execution of the to-be-used-nozzle-group flushing operation.

In addition, in the print operation, the controller 90 makes the volume of the ink ejected from each of the nozzles N in the non-use-nozzle-group flushing operation to be executed smaller than the volume of the ink ejected from each of the nozzles N in the to-be-used-nozzle-group flushing operation to be executed, by making a time interval between executions of the non-use-nozzle-group flushing operation longer than a time interval between executions of the to-be-used-nozzle-group flushing operation in the print operation.

In a case where the volume of the ink ejected from each of the nozzles N in the non-use-nozzle-group flushing operation is made smaller than the volume of the ink ejected from each of the nozzles N in the nozzle-group flushing operation to be executed in the print operation by making the volume of the ink ejected from each of the nozzles N in one execution of the non-use-nozzle-group flushing operation smaller than the volume of the ink ejected from each of the nozzles N in one execution of the to-be-used-nozzle-group flushing operation, the time interval between executions of the non-use-nozzle-group flushing operation may be same as the time interval between executions of the to-be-used-nozzle-group flushing operation or different from the time interval between executions of the to-be-used-nozzle-group flushing operation in the print operation, and, for example, may be shorter than the time interval between executions of the to-be-used-nozzle-group flushing operation.

In addition, when the volume of the ink ejected from each of the nozzles N in the non-use-nozzle-group flushing operation to be executed is made smaller than the volume of the ink ejected from each of the nozzles N in the to-be-used-nozzle-group flushing operation to be executed in the print operation by making the time interval between executions of the non-use-nozzle-group flushing operation longer than the time interval between executions of the to-be-used-nozzle-group flushing operation in the print operation, the volume of the ink ejected from each of the nozzles N in one execution of the non-use-nozzle-group flushing operation may be same as the volume of the ink ejected from each of the nozzles in one execution of the to-be-used-nozzle-group flushing operation or different from the volume of the ink ejected from each of the nozzles in one execution of the to-be-used-nozzle-group flushing operation in the print operation, and, for example, may be larger than volume of the ink ejected from each of the nozzles in one execution of the to-be-used-nozzle-group flushing operation.

In the present embodiment, a print mode that the controller 90 determines as a monochrome print mode from the conditions of the print job J corresponds to the print mode with a non-use nozzle group using the black ink without using the color ink including the cyan ink, the magenta ink, and the yellow ink. For example, of the conditions of the print job J, when the print mode is monochrome, the controller 90 determines that a print mode of printing to be performed is the monochrome print mode. At this time, the to-be-used ejecting unit group is the black ink ejecting unit group, and the non-use ejecting unit group is the color ink ejecting unit group including the cyan ink ejecting unit group, the magenta ink ejecting unit group, and the yellow ink ejecting unit group.

In the present embodiment, a print mode that the controller 90 determines as a second color ink print mode from the conditions of the print job J corresponds to the print mode with a non-use nozzle group using the color ink including the cyan ink, the magenta ink, and the yellow ink and without using the black ink. For example, of the conditions of the print job J, when the print mode is color and the picture quality mode is the high picture quality, or when the print mode is color and the kind of paper P is the photo paper, the controller 90 determines the print mode of printing to be performed is the second color print mode. At this time, the to-be-used ejecting unit group is the color ink ejecting unit group including the cyan ink ejecting unit group, the magenta ink ejecting unit group, and the yellow ink ejecting unit group, and the non-use ejecting unit group is the black ink ejecting unit group.

Figure 6:
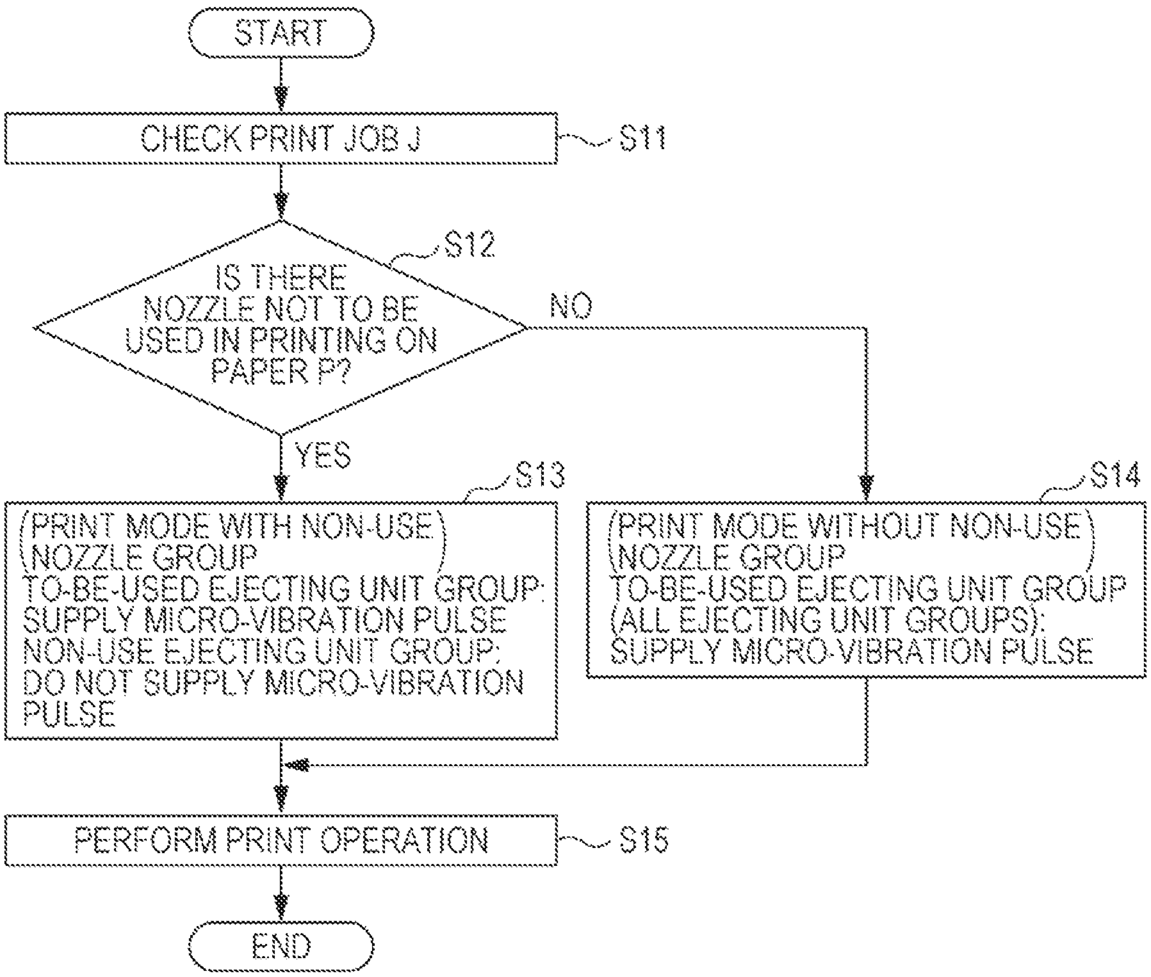
FIG. 6 is a flowchart illustrating a processing flow when a print operation is executed.

Next, with reference to a flow chart illustrated in FIG. 6, a description is given of flow of processing when the controller 90 executes the print operation based on the print job J. In the present embodiment, the flow of processing when the controller 90 executes the print operation based on the print job J corresponds to a method of controlling the liquid ejecting apparatus 100.

When the user inputs various conditions of the print job J described above by operating the external apparatus 200 or the operation unit 82, the controller 90 checks the various conditions of the print job J inputted in step S11.

In step S11, when checking the various inputted conditions of the print job J, the controller 90 shifts the processing to step S12.

In step S12, in the printing to be performed based on the print job J, the controller 90 checks whether or not there is any nozzle group not to be used in printing on the paper P. In the present embodiment, the controller 90 determines whether or not there is any nozzle group not to be used in the printing on the print P, from the print mode (color/monochrome), the kind of paper P (photo paper/plane paper), the picture quality mode (high quality/normal/low quality), of the various conditions of the print job J. In a case where the controller 90 is not able to determine whether or not there is any nozzle group not to be used in the printing on the paper P only from the various conditions of the print job J, the controller 90 determines that there is no nozzle group not to be used in the printing on the paper P. If there is any nozzle group not to be used in the printing on the paper P, step S12 is YES. The controller 90 shifts the processing to step S13.

The controller 90 determines that the printing to be performed based on the print job J is the print mode with a non-use nozzle group, and sets specifications for supplying the driving element E of each of the ejecting unit groups with the micro-vibration pulse Pb to specifications for the print mode with a non-use nozzle group in step S13. In the present embodiment, in the in-printing period of the print operation to perform the printing in the print mode with a non-use nozzle group, the controller 90 supplies driving element E of the to-be-used ejecting unit group with the in-printing micro-vibration pulse Pbp in the period without ejection of the ink, and does not supply the driving element E of the non-use ejecting unit group with the micro-vibration pulse Pb even in the period without ejection of the ink.

In the present embodiment, in the out-of-printing period of the print operation to perform the printing in the print mode with a non-use nozzle group, the controller 90 supplies the driving element E of the to-be-used ejecting unit group with the out-of-printing micro-vibration pulse Pbm, and does not supply the driving element E of the non-use ejecting unit group with the micro-vibration pulse Pb. If the controller 90 sets the specifications for supplying the driving element E of each of the ejecting unit groups with the micro-vibration pulse Pb to the specifications for the print mode with a non-use nozzle group in step S13, the controller 90 shifts the processing to step S15.

In step S12, in the printing to be performed based on the print job J, when there is no nozzle group not to be used in the printing on the paper P, step S12 is NO. The controller 90 shifts the processing to step S14.

The controller 90 determines that the printing to be performed based on the print job J is the print mode without a non-use nozzle group, and sets the specifications for supplying the driving element E of each of the ejecting unit groups with the micro-vibration pulse Pb to the specifications for the print mode without a non-use nozzle group in step S14. In the present embodiment, in the in-printing period of the print operation to perform the printing in the print mode without a non-use nozzle group, the controller 90 supplies the driving elements E of the to-be-used ejecting unit group, more specifically, all of the ejecting unit groups, with the in-printing micro-vibration pulse Pbp in the period without ejection of the ink.

In addition, in the present embodiment, in the out-of-printing period of the print operation to perform the printing in the print mode without a non-use nozzle group, the controller 90 supplies the driving elements E of the to-be-used ejecting unit group, more specifically, all of the ejecting unit groups, with the out-of-printing micro-vibration pulse Pbm. In step S14, when the controller 90 sets the specifications for supplying the driving element E of each ejecting unit groups with the micro-vibration pulse Pb to the specifications for the print mode without a non-use nozzle group, the controller 90 shifts the processing to step S15.

In step S15, the controller 90 executes the print operation to perform printing on the paper P based on the inputted print job J. When starting the print operation, the controller 90 changes the liquid ejecting head 10 from the standby state in which the liquid ejecting head 10 is capped to a state in which the liquid ejecting head 10 is able to start printing, by moving the cap 52 in the capping position to the isolated position. Then, the controller 90 performs printing by causing the transport unit 30 to transport the paper P to the printable position, causing the driver circuit 15 to supply the driving element E of the to-be-used ejecting unit group with the ejection pulse Pep, and causing the ink to be ejected from the nozzles N of the liquid ejecting head 10 to the paper P at the printable position. When the printing based on the print job J ends, the controller 90 finishes the print operation by moving the cap 52 at the isolated position to the capping position and placing the liquid ejecting head 10 in the standby state in which it is capped.

In addition, the controller 90 executes the micro-vibration operation by controlling the driver circuit 15. In this case, when the printing to be performed based on the print job J is in the print mode with a non-use nozzle group, the controller 90 performs, according to the specifications for the print mode with a non-use nozzle group, the supply of the micro-vibration pulse Pb to the driving element E of each ejecting unit group, which is performed in the in-printing period and the out-of-printing period of the print operation. In addition, when the printing to be performed based on the print job J is in the print mode without a non-use nozzle group, the controller 90 performs, according to the specifications for print mode without a non-use nozzle group, the supply of the micro-vibration pulse Pb to the driving element E of each ejecting unit group which is performed in the in-printing period and the out-of-printing period in the print operation.

In addition, the controller 90 executes the flushing operation by controlling the driver circuit 15 in the print operation. The flushing operation includes the flushing operation to be executed as needed either immediately after the release of the capping or immediately before the capping after the printing ends, and the regular flushing operation to be executed each time the preset period elapses. Furthermore, the regular flushing includes the to-be-used-nozzle-group flushing operation and the non-use-nozzle-group flushing operation.

The controller 90 makes the volume of the ink ejected from each of the nozzles N in the non-use-nozzle-group flushing operation to be executed smaller than the volume of the ink ejected from each of the nozzles N in the to-be-used-nozzle-group flushing operation to be executed in the print operation. In this case, the controller 90 makes the volume of the ink ejected from each of the nozzles N in one execution of the non-use-nozzle-group flushing operation smaller than the volume of the ink ejected from each of the nozzles N in one execution of the to-be-used-nozzle-group flushing operation. In addition, the controller 90 makes the time interval between executions of the non-use-nozzle-group flushing operation longer than the time interval between executions of the to-be-used-nozzle-group flushing operation, in the print operation.

When performing the processing of step S15, the controller 90 finishes the processing of executing the print operation based on the print job J.

As described above, the liquid ejecting apparatus 100 and the method of controlling the liquid ejecting apparatus 100 according to the embodiment make it possible to achieve the following effects.

A liquid ejecting apparatus 100 includes a plurality of ejecting units 13 each including a nozzle N configured to eject an ink, a pressure chamber C that communicates with the nozzle N, and a driving element E that causes a pressure fluctuation in the ink in the pressure chamber C by being supplied with a driving pulse P; a driver circuit 15 configured to supply the driving element E of corresponding one of the ejecting units 13 with driving pulse P including an ejection pulse Pep for ejecting the ink from the nozzle N and an in-printing micro-vibration pulse Pbp for vibrating a gas-liquid interface in the nozzle N when the ink is not ejected from the nozzle N; and the controller 90. Here, the controller 90 controls the driver circuit 15 based on a print job J for executing a print operation to perform printing on paper P, thereby executing the print operation by causing the ink to be ejected from the nozzles N, the plurality of ejecting units 13 forms a plurality of ejecting unit groups each including a plurality of nozzles N constituting the nozzle array 12 configured to eject any ink among a plurality of kinds of inks, and in a case in which the ejecting unit group configured to eject the ink to be used in the printing on the paper P is referred to as a to-be-used ejecting unit group and the ejecting unit group configured to eject the ink not to be used in the printing is referred to as the non-use ejecting unit group, when the printing is in a print mode without a non-use nozzle group in which the plurality of kinds of inks is used, the controller 90 controls the driver circuit 15 such that, in the print operation to perform the printing in the print mode without a non-use nozzle group, the driver circuit 15 supplies the driving elements E of the to-be-used ejecting unit groups with the ejection pulse Pep in a period with ejection of the ink and the in-printing micro-vibration pulse Pbp in a period without ejection of the ink, and when the printing is in the print mode with a non-use nozzle group in which any of the plurality of kinds of inks is not used, the controller 90 controls the driver circuit 15 such that, in the print operation to perform the printing in the print mode with a non-use nozzle group, the driver circuit 15 supplies the driving elements E of the to-be-used ejecting unit group with the ejection pulse Pep in a period with ejection of the ink and the in-printing micro-vibration pulse Pbp in a period without ejection of the ink, and does not supply the driving elements E of the non-use ejecting unit group with the micro-vibration pulse Pb even in a period without ejection of the ink.

This makes it possible to suppress diffusion of the ink with increased viscosity in the vicinity of the nozzles N to the side of the pressure chamber C, because micro-vibration is not performed in the non-use ejecting unit group not to be used in the printing on the paper P.

In the liquid ejecting apparatus 100, the controller 90 executes a to-be-used-nozzle-group flushing operation of ejecting the ink from the nozzles N in the to-be-used ejecting unit group and a non-use-nozzle-group flushing operation of ejecting the ink from the nozzles N in the non-use ejecting unit group. This makes it possible to maintain a state of the ink by executing the flushing operation.

In the liquid ejecting apparatus 100, in the print operation, a volume of the ink ejected from the nozzles N in one execution of the non-use-nozzle-group flushing operation is smaller than a volume of the ink ejected from the nozzles N in one execution of the to-be-used-nozzle-group flushing operation. This makes it possible to reduce a discharge amount of the ink ejected from the nozzles N of the non-use ejecting unit group that is not used in the print operation.

In the liquid ejecting apparatus 100, in the print operation, a time interval between executions of the non-use-nozzle-group flushing operation is longer than a time interval between executions of the to-be-used-nozzle-group flushing operation. This makes it possible to reduce the discharge amount of the ink ejected from the nozzles N of the non-use ejecting unit group that is not used in the print operation.

In the liquid ejecting apparatus 100, the plurality of kinds of inks is a black ink and a color ink different in color from the black ink, the plurality of ejecting unit groups is a black ink ejecting unit group including a plurality of nozzles N constituting a black ink nozzle group configured to eject the black ink, and a color ink ejecting unit group including a plurality of nozzles N constituting a color ink nozzle group configured to eject the color ink, the print mode without a non-use nozzle group is a first color print mode using the color ink and the black ink, in which the to-be-used ejecting unit group includes the color ink ejecting unit group and the black ink ejecting unit group, and the print mode with a non-use nozzle group is a monochrome print mode using the black ink without using the color ink, in which the to-be-used ejecting unit group is the black ink ejecting unit group and the non-use ejecting unit group is the color ink ejecting unit group. This makes it possible to suppress the diffusion of the color ink with increased viscosity in the vicinity of the nozzles N to the side of the pressure chamber C, because the micro-vibration is not performed in the print operation in the color ink ejecting unit group that is not used in the printing in the monochrome print mode using the black ink without using the color ink.

In the liquid ejecting apparatus 100, the plurality of kinds of inks is a black ink and a color ink different in color from the black ink, the plurality of ejecting unit groups is a black ink ejecting unit group including a plurality of nozzles N constituting a black ink nozzle group configured to eject the black ink, and a color ink ejecting unit group including a plurality of nozzles N constituting a color ink nozzle group configured to eject the color ink, the print mode without a non-use nozzle group is a first color print mode using the color ink and the black ink, in which the to-be-used ejecting unit group includes the color ink ejecting unit group and the black ink ejecting unit group, and the print mode with a non-use nozzle group is a second color print mode using the color ink without using the black ink, in which the to-be-used ejecting unit group is the color ink ejecting unit group and the non-use ejecting unit group is the black ink ejecting unit group. This makes it possible to suppress the diffusion of the black ink with increased viscosity in the vicinity of the nozzles N to the side of the pressure chamber C, because the micro-vibration is not performed in the print operation in the black ink ejecting unit group that is not used in the printing in the second color print mode using the color ink without using the black ink.

A method of controlling a liquid ejecting apparatus 100 includes a plurality of ejecting units 13 each including a nozzle N configured to eject an ink, a pressure chamber C that communicates with the nozzle N, and a driving element E that causes a pressure fluctuation in the ink in the pressure chamber C by being supplied with a driving pulse P. Here, the plurality of ejecting units 13 forms a plurality of ejecting unit groups each including a plurality of nozzles N constituting a nozzle array 12 configured to eject any ink among a plurality of kinds of inks, and the liquid ejecting apparatus 100 is configured to execute a print operation to perform printing on paper P by supplying the driving element E with driving pulse P including an ejection pulse Pep for ejecting the ink from the nozzle N and an in-printing micro-vibration pulse Pbp for vibrating a gas-liquid interface in the nozzle N when the ink is not ejected from the nozzle N, the method includes: in a case in which the ejecting unit group configured to eject the ink to be used in the printing on the paper P is referred to as a to-be-used ejecting unit group and the ejecting unit group configured to eject the ink not to be used in the printing is referred to as the non-use ejecting unit group, when the printing is in a print mode without a non-use nozzle group in which the plurality of kinds of inks is used, supplying the driving elements E of the to-be-used ejecting unit groups with the ejection pulse Pep in a period with ejection of the ink and the in-printing micro-vibration pulse Pbp in a period without ejection of the ink in the print operation to perform the printing in the print mode without a non-use nozzle group, and when the printing is in a print mode with a non-use nozzle group in which any of the plurality of kinds of inks is not used, supplying the driving elements E of the to-be-used ejecting unit group with the ejection pulse Pep in a period with ejection of the ink and the in-printing micro-vibration pulse Pbp in a period without ejection of the ink while not supplying the driving elements E of the non-use ejecting unit group with the micro-vibration pulse Pb even in a period without ejection of the ink in the print operation to perform the printing in the print mode with a non-use nozzle group.

This makes it possible to suppress diffusion of the ink with increased viscosity in the vicinity of the nozzles N to the side of the pressure chamber C, because micro-vibration is not performed in the non-use ejecting unit group not to be used in the printing on the paper P.

The method of controlling the liquid ejecting apparatus 100 executes a to-be-used-nozzle-group flushing operation of ejecting the ink from the nozzles N in the to-be-used ejecting unit group and a non-use-nozzle-group flushing operation of ejecting the ink from the nozzles N in the non-use ejecting unit group. This makes it possible to maintain a state of the ink by executing the flushing operation.

In the method of controlling the liquid ejecting apparatus 100, in the print operation, a volume of the ink ejected from the nozzles N in one execution of the non-use-nozzle-group flushing operation is smaller than a volume of the ink ejected from the nozzles N in one execution of the to-be-used-nozzle-group flushing operation. This makes it possible to reduce a discharge amount of the ink ejected from the nozzles N of the non-use ejecting unit group not used in the print operation.

In the method of controlling the liquid ejecting apparatus 100, in the print operation, a time interval between executions of the non-use-nozzle-group flushing operation is longer than a time interval between executions of the to-be-used-nozzle-group flushing operation. This makes it possible to reduce the discharge amount of the ink ejected from the nozzles N of the non-use ejecting unit group not used in the print operation.

In the method of controlling the liquid ejecting apparatus 100, the plurality of kinds of inks is a black ink and a color ink different in color from the black ink, the plurality of ejecting unit groups is a black ink ejecting unit group including a plurality of nozzles N constituting a black ink nozzle group configured to eject the black ink, and a color ink ejecting unit group including a plurality of nozzles N constituting a color ink nozzle group configured to eject the color ink, the print mode without a non-use nozzle group is a first color print mode using the color ink and the black ink, in which the to-be-used ejecting unit group includes the color ink ejecting unit group and the black ink ejecting unit group, and the print mode with a non-use nozzle group is a monochrome print mode using the black ink without using the color ink, in which the to-be-used ejecting unit group is the black ink ejecting unit group and the non-use ejecting unit group is the color ink ejecting unit group. This makes it possible to suppress the diffusion of the color ink with increased viscosity in the vicinity of the nozzles N to the side of the pressure chamber C, because the micro-vibration is not performed in the print operation in the color ink ejecting unit group that is not used in the monochrome print mode using the black ink without using the color ink.

In the method of controlling the liquid ejecting apparatus 100, the plurality of kinds of inks is a black ink and a color ink different in color from the black ink, the plurality of ejecting unit groups is a black ink ejecting unit group including a plurality of nozzles N constituting a black ink nozzle group configured to eject the black ink, and a color ink ejecting unit group including a plurality of nozzles N constituting a color ink nozzle group configured to eject the color ink, the print mode without a non-use nozzle group is a first color print mode using the color ink and the black ink, in which the to-be-used ejecting unit group includes the color ink ejecting unit group and the black ink ejecting unit group, and the print mode with a non-use nozzle group is a second color print mode using the color ink without using the black ink, in which the to-be-used ejecting unit group is the color ink ejecting unit group and the non-use ejecting unit group is the black ink ejecting unit group. This makes it possible to suppress the diffusion of the black ink with increased viscosity in the vicinity of the nozzles N to the side of the pressure chamber C, because the micro-vibration is not performed in the print operation in the black ink ejecting unit group that is not used in the printing in the second color print mode using the color ink without using the black ink.

Although basically, the liquid ejecting apparatus 100 according to the above-described embodiment of the present disclosure has such a configuration as described above, as a matter of course, a partial modification or an omission may be made to the configuration without departing from a gist of the present disclosure. In addition, it is possible to mutually combine and implement the above-described embodiments and other embodiment to be described below as far as they are not technologically inconsistent. In the following, a description is given of the other embodiments.

In the above-described embodiment, the number of the color inks different in color from the black ink ejected from the nozzles N by the liquid ejecting head 10 may be three or more. For example, the color inks different in color from the black ink may be five kinds of a cyan ink, a magenta ink, a yellow ink, a red ink, and a green ink. In this case, the liquid ejecting head 10 may have nozzle arrays 12*a*, 12*b*, 12*c*, 12*d*, 12*e*, and 12*f*.

An example of the nozzle group of the liquid ejecting head 10, which is the line head, may not be the nozzle array 12 in which the plurality of nozzles N is linearly arranged at equal intervals in the X axis direction. For example, the nozzle group of the liquid ejecting head 10 may be a nozzle group configured by arranging a plurality of nozzle arrays in a staggered manner, the nozzle arrays being formed by a plurality of nozzles N that eject an ink of a same color in a line in the X axis direction. In addition, for example, a nozzle group of the liquid ejecting head 10 may be a nozzle group configured by arranging a plurality of nozzle arrays in the X axis direction, the nozzle arrays being formed by a plurality of nozzles N that eject an ink of same color in a line in a direction crossing the X axis direction.

In the above-described embodiment, an example of a nozzle group of the liquid ejecting head 10, which is the line head, may not be the nozzle array 12 in which the plurality of nozzles N is linearly arranged at equal intervals along the X axis direction. For example, on the nozzle surface 11, a plurality of nozzle groups of the liquid ejecting head 10 may be nozzle portions Hn provided in an area corresponding to paper Pn a size of which is smaller than that of paper Pw, and nozzle portions Hw provided in an area adjacent to side of the −X direction of the nozzle portions Hn. In addition, of the conditions of the print job J, when the size of the paper P is Pn and the transport direction of the paper P is the longitudinal direction, the controller 90 determines that printing to be performed is in the print mode with a non-use nozzle group. At this time, the to-be-used ejecting unit group is the nozzle portions Hn and the non-use ejecting unit group is the nozzle portions Hw.

In the above-described embodiment, the time to execute the regular flushing operation may not be the time when there is no paper P at a position which is vertically below side of the +Z direction of the nozzle surface 11 of the liquid ejecting head 10 and the time when a period elapsed since the previously executed flushing operation does not exceed the preset period. For example, when the period elapsed since the previously executed flushing operation reaches the preset period, the controller 90 may move the cap 52 to the opposite position and execute the flushing operation even in a case in which there is the paper P vertically below the side of the nozzle surface 11 of the liquid ejecting head 10. Alternatively, provided that the time elapsed since the previously executed flushing operation does not exceed the preset period, the controller 90 may also execute the flushing operation for every preset number of papers P to be printed.

In the above-described embodiment, based on various conditions instructed in a print job J, the controller 90 may change a method of making a volume of ink ejected from each of the nozzles N in the non-use-nozzle-group flushing operation to be executed smaller than a volume of ink ejected from each of the nozzles N in the to-be-used-nozzle-group flushing operation to be executed in the print operation. For example, when it is possible to determine from the various conditions instructed in the print job J that time involved in the print operation is shorter than a preset time, the controller 90 may make the time interval of executions of the non-use-nozzle-group flushing operation longer than the time interval between executions of the to-be-used-nozzle-group flushing operation. When it is possible to determine from the various conditions instructed in the print job J that the time involved in the print operation is longer than the preset time, the controller 90 may make the volume of ink ejected from each of the nozzles N in one execution of the non-use-nozzle-group flushing operation smaller than the volume of ink ejected from each of the nozzles N in one execution of the to-be-used-nozzle-group flushing operation. Thereby, in the print operation, the controller 90 may make the volume of the ink ejected from each of the nozzles N in the non-use-nozzle-group flushing operation to be executed smaller than the volume of ink ejected from each of the nozzles N in the to-be-used-nozzle-group flushing operation to be executed.

In the above-described embodiment, based on various conditions instructed in a print job J, the controller 90 may change a method of making a volume of ink ejected from each of the nozzles N in the non-use-nozzle-group flushing operation to be executed smaller than a volume of ink ejected from each of the nozzles N in the to-be-used-nozzle-group flushing operation to be executed in the print operation. For example, when it is possible to determine from the various conditions instructed in the print job J that time involved in the print operation is shorter than a preset time, the controller 90 may make the time interval of executions of the non-use-nozzle-group flushing operation longer than the time interval between executions of the to-be-used-nozzle-group flushing operation. When it is possible to determine from the various conditions instructed in the print job J that the time involved in the print operation is longer than the preset time, the controller 90 may make the volume of ink ejected from each of the nozzles N in one execution of the non-use-nozzle-group flushing operation smaller than the volume of ink ejected from each of the nozzles in one execution of the to-be-used-nozzle-group flushing operation. Thereby, in the print operation, the controller 90 may make the volume of the ink ejected from each of the nozzles N in the non-use-nozzle-group flushing operation to be executed smaller than the volume of ink ejected from each of the nozzles N in the to-be-used-nozzle-group flushing operation to be executed.

In the above-described embodiment, the controller 90 does not have to supply the driving element E of the to-be-used ejecting unit group with the out-of-printing micro-vibration pulse Pbm in the out-of-printing period of the print operation to perform the printing in the print mode with a non-use nozzle group. For example, the controller 90 does not have to supply the driving elements E of the to-be-used ejecting unit group with the out-of-printing micro-vibration pulse Pbm in the pre-printing period of the print operation to perform the printing in the print mode with a non-use nozzle group. Alternatively, when it is possible to determine from the various conditions instructed in the print job J that the time involved in the print operation is shorter than the preset time, the controller 90 does not have to supply the driving elements E of the to-be-used ejecting unit group with the out-of-printing micro-vibration pulse Pbm in the out-of-printing period of the print operation to perform the printing in the print mode with a non-use nozzle group.

In the above-described embodiment, the controller 90 may supply the driving elements E of the non-use ejecting unit group with the out-of-printing micro-vibration pulse Pbm in the out-of-printing period other than the pre-printing period in the print operation to perform the printing in the print mode with a non-use nozzle group. For example, when it is possible to determine from the various conditions instructed in the print job J that the time involved in the print operation is longer than the preset time, in the out-of-printing period other than the pre-printing period in the print operation to perform the printing in the print mode with a non-use nozzle group, the controller 90 does not supply the driving elements E of the non-use ejecting unit group with the out-of-printing micro-vibration pulse Pbm till the preset time, and may supply the out-of-printing micro-vibration pulse Pbm in a case in which the preset time is exceeded.

In the above-described embodiment, after finishing the print job, the controller 90 may execute the micro-vibration operation in the standby state in which the liquid ejecting head 10 is capped. For example, after executing the print operation that is longer than the preset time, the controller 90 may supply the out-of-printing micro-vibration pulse Pbm to the driving elements E of the non-use ejecting unit group in the last-executed print operation, in the standby state in which the liquid ejecting head 10 is capped. Alternatively, after executing the print operation that is longer than the preset time, the controller 90 may supply the out-of-printing micro-vibration pulse Pbm to the driving elements E of the non-use ejecting unit group and the to-be-used ejecting unit group in the last-executed print operation, in the standby state in which the liquid ejecting head 10 is capped.

Figure 7:
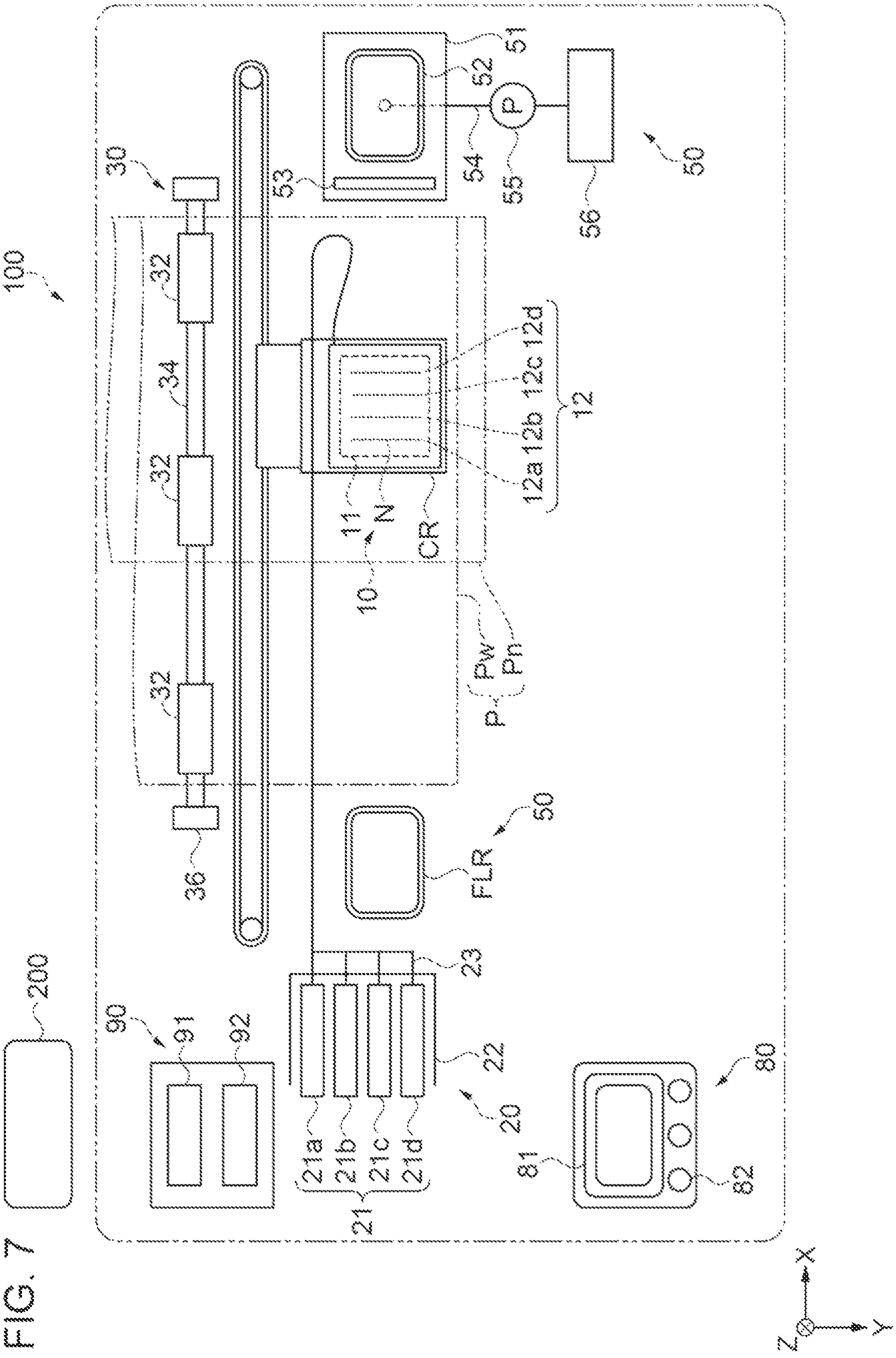
FIG. 7 is a block diagram illustrating another embodiment in which specifications of a liquid ejecting apparatus are partly changed.

In the above-described embodiment, the liquid ejecting head 10 may not be the line head. For example, as illustrated in FIG. 7, each of the nozzle arrays 12*a*, 12*b*, 12*c*, and 12*d* of the liquid ejecting head 10 may be along the Y axis direction, and the nozzle arrays 12*a*, 12*b*, 12*c*, and 12*d* may be spaced from each other in the X axis direction. Then, the print operation to perform the printing may be executed, by the liquid ejecting head 10 mounted on a carriage CR ejecting ink on the paper P while moving in the X axis direction. In this case, the flushing operation is executed at a position where the nozzle surface 11 of the liquid ejecting head 10 faces either the cap 52, which is located in the +X direction with respect to the paper P, or the flushing receiver FLR, which is located in the −X direction with respect to the paper P. In this case, the controller 90 may execute the regular flushing operation, while the liquid ejecting head 10 is moving to the X axis direction in the print operation, and at the time when the nozzle surface 11 faces either the cap 52 or the flushing receiver FLR and the period elapsed since the previously executed flushing operation does not exceed the preset period.

What is claimed is:

1. A liquid ejecting apparatus comprising:

a plurality of ejecting units each including a nozzle configured to eject a liquid, a pressure chamber that communicates with the nozzle, and a driving element configured to cause a pressure fluctuation in the liquid in the pressure chamber by being supplied with a driving pulse;

a driver circuit configured to supply the driving elements with a driving pulse including an ejection pulse for causing the liquid to be ejected from the nozzle and a micro-vibration pulse for causing a gas-liquid interface in the nozzle to be vibrated when the liquid is not ejected from the nozzle; and a controller configured to control the driver circuit, based on a print job for executing a print operation to perform printing on a medium, thereby executing the print operation by causing the liquid to be ejected from the nozzle, wherein the plurality of ejecting units are split into a plurality of ejecting unit groups each including a plurality of nozzles constituting a nozzle group configured to eject any of a plurality of kinds of liquids, and in a case in which one of the ejecting unit groups configured to eject a liquid to be used in printing on the medium is referred to as a to-be-used ejecting unit group and one of the ejecting unit groups configured to eject a liquid not to be used in the printing is referred to as the non-use ejecting unit group, when printing is in a print mode without a non-use nozzle group in which the plurality of kinds of liquids are used, the controller controls the driver circuit such that, in a print operation to perform the printing in the print mode without a non-use nozzle group, the driver circuit supplies driving elements of the to-be-used ejecting unit group with the ejection pulse in a period with ejection of the liquid and with the micro-vibration pulse in a period without ejection of the liquid, and when printing is in a print mode with a non-use nozzle group in which any of the plurality of kinds of liquids is not used, the controller controls the driver circuit such that, in a print operation to perform the printing in the print mode with a non-use nozzle group, the driver circuit supplies the driving elements of the to-be-used ejecting unit group with the ejection pulse in a period with ejection of the liquid and with the micro-vibration pulse in a period without ejection of the liquid and does not supply driving elements of the non-use ejecting unit group with the micro-vibration pulse even in the period without ejection of the liquid.

2. The liquid ejecting apparatus according to claim 1, wherein the controller executes a to-be-used-nozzle-group flushing operation of causing nozzles in the to-be-used ejecting unit group to eject the liquid and a non-use-nozzle-group flushing operation of causing nozzles in the non-use ejecting unit group to eject the liquid.

3. The liquid ejecting apparatus according to claim 2, wherein in the print operation, a volume of the liquid ejected from the nozzles in one non-use-nozzle-group flushing operation is smaller than a volume of the liquid ejected from the nozzles in one to-be-used-nozzle-group flushing operation.

4. The liquid ejecting apparatus according to claim 2, wherein in the print operation, a time interval between executions of the non-use-nozzle-group flushing operation is longer than a time interval between executions of the to-be-used-nozzle-group flushing operation.

5. The liquid ejecting apparatus according to claim 1, wherein the plurality of kinds of liquids are a black ink and a color ink different in color from the black ink, the plurality of ejecting unit groups are a black ink ejecting unit group including a plurality of nozzles constituting a black ink nozzle group configured to eject the black ink and a color ink ejecting unit group including a plurality of nozzles constituting a color ink nozzle group configured to eject the color ink, the print mode without a non-use nozzle group is a first color print mode using the color ink and the black ink, in which the to-be-used ejecting unit group includes the color ink ejecting unit group and the black ink ejecting unit group, and the print mode with a non-use nozzle group is a monochrome print mode using the black ink without using the color ink, in which the to-be-used ejecting unit group is the black ink ejecting unit group and the non-use ejecting unit group is the color ink ejecting unit group.

6. The liquid ejecting apparatus according to claim 1, wherein the plurality of kinds of liquids are a black ink and a color ink different in color from the black ink, the plurality of ejecting unit groups are a black ink ejecting unit group including a plurality of nozzles constituting a black ink nozzle group configured to eject the black ink and a color ink ejecting unit group including a plurality of nozzles constituting a color ink nozzle group configured to eject the color ink, the print mode without a non-use nozzle group is a first color print mode using the color ink and the black ink, in which the to-be-used ejecting unit group includes the color ink ejecting unit group and the black ink ejecting unit group, and the print mode with a non-use nozzle group is a second color print mode using the color ink without using the black ink, in which the to-be-used ejecting unit group is the color ink ejecting unit group and the non-use ejecting unit group is the black ink ejecting unit group.

7. A method of controlling a liquid ejecting apparatus including a plurality of ejecting units each including a nozzle configured to eject a liquid, a pressure chamber that communicates with the nozzle, and a driving element configured to cause a pressure fluctuation in the liquid in the pressure chamber by being supplied with a driving pulse, the plurality of ejecting units being split into a plurality of ejecting unit groups each including a plurality of nozzles constituting a nozzle group configured to eject any of a plurality of kinds of liquids, the liquid ejecting apparatus being configured to execute a print operation to perform printing on a medium by supplying the driving element with a driving pulse including an ejection pulse for causing the liquid to be ejected from the nozzle and a micro-vibration pulse for causing a gas-liquid interface in the nozzle to be vibrated when the liquid is not ejected from the nozzle, the method comprising:

in a case in which one of the ejecting unit groups configured to eject a liquid to be used in printing on the medium is referred to as a to-be-used ejecting unit group and one of the ejecting unit groups configured to eject a liquid not to be used in the printing is referred to as the non-use ejecting unit group, when printing is in a print mode without a non-use nozzle group in which the plurality of kinds of liquids are used, in a print operation to perform the printing in the print mode without a non-use nozzle group, supplying driving elements of the to-be-used ejecting unit group with the ejection pulse in a period with ejection of the liquid and with the micro-vibration pulse in a period without ejection of the liquid; and when printing is in a print mode with a non-use nozzle group in which any of the plurality of kinds of liquids is not used, in a print operation to perform the printing in the print mode with a non-use nozzle group, supplying the driving elements of the to-be-used ejecting unit group with the ejection pulse in a period with ejection of the liquid and with the micro-vibration pulse in a period without ejection of the liquid and not supplying driving elements of the non-use ejecting unit group with the micro-vibration pulse even in the period without ejection of the liquid.

8. The method of controlling a liquid ejecting apparatus according to claim 7, further comprising executing a to-be-used-nozzle-group flushing operation of causing nozzles in the to-be-used ejecting unit group to eject the liquid and a non-use-nozzle-group flushing operation of causing nozzles in the non-use ejecting unit group to eject the liquid.

9. The method of controlling a liquid ejecting apparatus according to claim 8, wherein in the print operation, a volume of the liquid ejected from the nozzles in one non-use-nozzle-group flushing operation is smaller than a volume of the liquid ejected from the nozzles in one to-be-used-nozzle-group flushing operation.

10. The method of controlling a liquid ejecting apparatus according to claim 8, wherein in the print operation, a time interval between executions of the non-use-nozzle-group flushing operation is longer than a time interval between executions of the to-be-used-nozzle-group flushing operation.

11. The method of controlling a liquid ejecting apparatus according to claim 7, wherein the plurality of kinds of liquids are a black ink and a color ink different in color from the black ink, the plurality of ejecting unit groups are a black ink ejecting unit group including a plurality of nozzles constituting a black ink nozzle group configured to eject the black ink and a color ink ejecting unit group including a plurality of nozzles constituting a color ink nozzle group configured to eject the color ink, the print mode without a non-use nozzle group is a first color print mode using the color ink and the black ink, in which the to-be-used ejecting unit group includes the color ink ejecting unit group and the black ink ejecting unit group, and the print mode with a non-use nozzle group is a monochrome print mode using the black ink without using the color ink, in which the to-be-used ejecting unit group is the black ink ejecting unit group and the non-use ejecting unit group is the color ink ejecting unit group.

12. The method of controlling a liquid ejecting apparatus according to claim 7, wherein the plurality of kinds of liquids are a black ink and a color ink different in color from the black ink, the plurality of ejecting unit groups are a black ink ejecting unit group including a plurality of nozzles constituting a black ink nozzle group configured to eject the black ink and a color ink ejecting unit group including a plurality of nozzles constituting a color ink nozzle group configured to eject the color ink, the print mode without a non-use nozzle group is a first color print mode using the color ink and the black ink, in which the to-be-used ejecting unit group includes the color ink ejecting unit group and the black ink ejecting unit group, and the print mode with a non-use nozzle group is a second color print mode using the color ink without using the black ink, in which the to-be-used ejecting unit group is the color ink ejecting unit group and the non-use ejecting unit group is the black ink ejecting unit group.

* * * * *